UNITED STATES PATENT OFFICE.

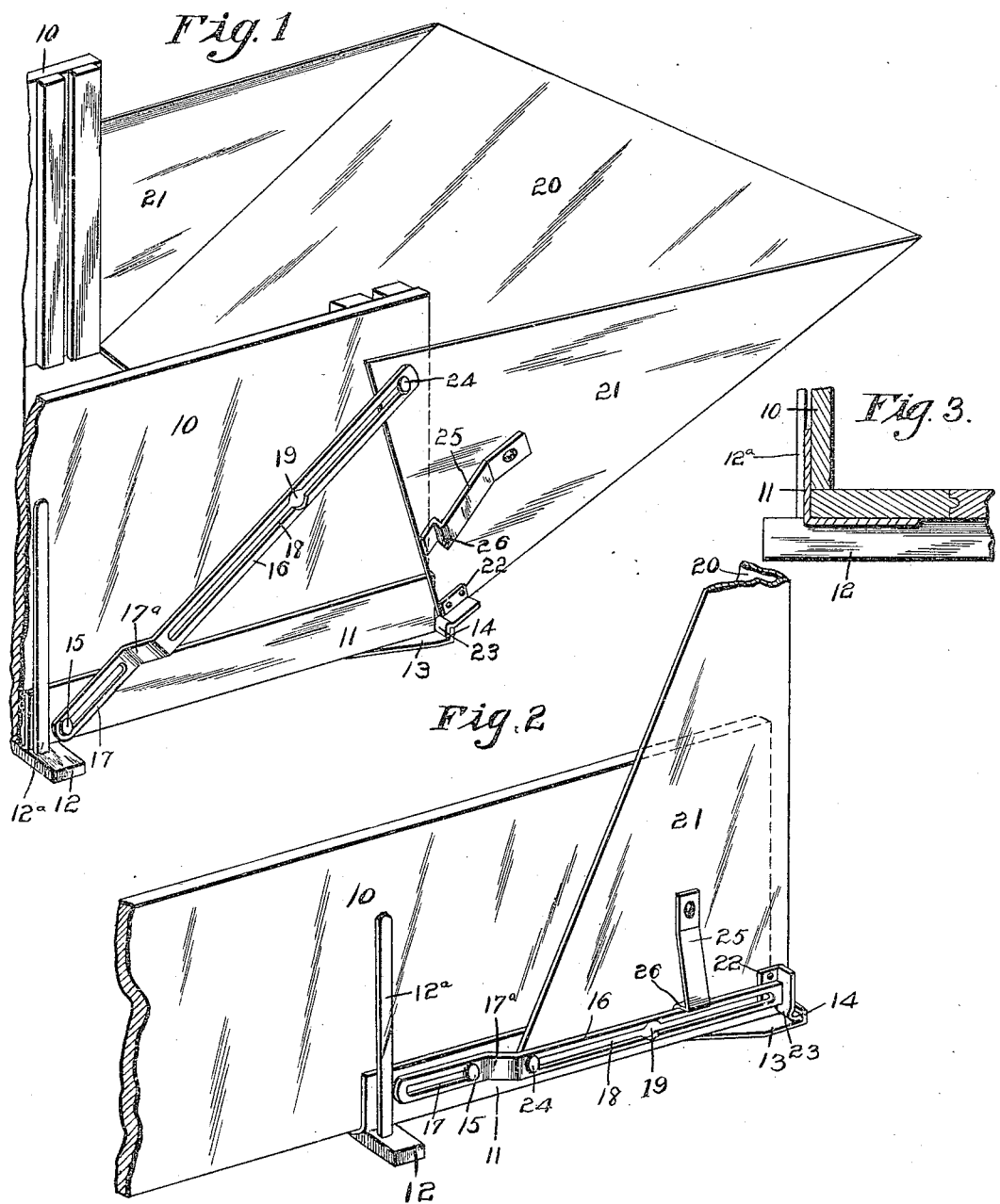

GEORGE WASHINGTON EDSON, OF GUTHRIE CENTER, IOWA.

WAGON END-GATE.

949,566.  Specification of Letters Patent.  Patented Feb. 15, 1910.

Application filed January 2, 1909. Serial No. 470,347.

*To all whom it may concern:*

Be it known that I, GEORGE WASHINGTON EDSON, a citizen of the United States, residing at Guthrie Center, in the county of Guthrie and State of Iowa, have invented a certain new and useful Wagon End-Gate, of which the following is a specification.

The object of my invention is to provide a wagon end gate of simple, durable and inexpensive construction that may be readily, quickly and easily attached to or detached from any ordinary wagon, and when so attached, may be quickly and easily adjusted to either its open position for use as a shoveling board, or to its closed position, and when in either position it will be firmly and securely held and supported, without the necessity of the operator manually adjusting any fastening devices of any kind.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a perspective view of a portion of a wagon bed, and my improved end gate applied thereto in its open position for use as a shoveling board. Fig. 2 shows a similar view, showing one side of the wagon bed only, and also showing one side of the end gate only, the latter being in its closed position, and—Fig. 3 shows a detail sectional view through the lower portion of one corner of the wagon bed, to illustrate the supporting bracket of my improved device applied thereto.

Referring to the accompanying drawings, I have used the reference numeral 10 to indicate that portion of the wagon bed shown. Attached to the rear lower corners thereof, at each side, is an angle bar 11, firmly secured by having the forward end of its horizontal side inserted between the bottom of the wagon bed and the rear clip 12, that is usually provided on wagon beds, and having the forward end of its vertical side inserted between the wagon bed and the bolster 12$^a$. Hence, they serve to strengthen and reinforce the wagon bed itself. On the bottom of each of said angle bars is an outwardly and rearwardly extended bracket 13 having a projecting lug 14 thereon at the side of the angle bar 11.

At the forward end of the angle bar 11 is a headed pin 15. This pin is designed to slidingly support a lever 16, which is provided with a slot 17 to receive the pin 15, and in the rear of the slot it inclines outwardly and rearwardly at 17$^a$. Its straight body portion is provided with a longitudinal slot 18 having at its central portion an enlarged opening 19.

The end gate proper comprises a body portion 20 designed to be used as a shoveling board, and side wings 21. Connected to each of the rear lower corners of the side wings is a bracket 22 having a lug 23 thereon, designed to rest upon the bracket 13 and to engage the forward edge of the lug 14. By this means, the end gate is pivotally and detachably connected to the wagon. Each of the wings 21 is provided with a headed pin 24. The head is of such size that it may freely enter through the enlarged portion 19 of the slot 18, and the shank of said pin may freely slide through said slot 18.

When the end gate is in position for use as a shoveling board, its lower edge will engage the bottom of the wagon bed, and thus prevent forward movement, and the lugs 22 and 14 will prevent rearward movement thereof. The levers 16 in engagement with the pins 15 and 24, will hold the end gate firmly in position for use as a shoveling board. If it is desired to fold the end gate to its closed position, the operator simply moves it to the desired position, whereupon the pins 15 and 24 will stand in the opposite ends of their respective slots, as shown in Fig. 2.

In order to firmly secure the end gate in its closed position, it is necessary to force the levers 16 downwardly to substantially horizontal positions, as shown in Fig. 2, and in order to prevent them from moving upwardly, I provide on each of the wings 21 a spring plate 25 having a shoulder 26, and so arranged that said shoulder will engage the lever 16 and prevent it from moving upwardly. The said lever 16 is made of material that will spring outwardly beyond the shoulder 26, hence, when it is desired to lower the end gate to its position for use as a shoveling board, I grasp the rear ends of the levers 16 and move them outwardly far enough to clear the shoulders 26, whereupon the end gate may be swung rearwardly until the parts assume the position shown in Fig. 1.

In order to detach the end gate from the wagon, it is only necessary to move the end gate upwardly until the pins 24 are adjacent to the openings 19, whereupon the levers may be detached from the pins 24, and then the lugs 22 may be raised above the lugs 14, and the end gate may be bodily removed.

The construction of the end gate is obviously very simple, and inexpensive, and the parts that are attached to the wagon are not likely to interfere with the use of the wagon for any purpose, and serve to strengthen and reinforce the wagon, in addition to their function of supporting the end gate. Furthermore, it is obvious that the operator need not manipulate any mechanism in the time that he is moving the end gate from one position to the other.

I claim as my invention:

1. An improved wagon end gate comprising a body portion and two wings, and an attaching device for each side of the end gate comprising an angle bar designed to be fixed to a wagon bed, a bracket at the rear outer corner thereof, an upwardly projecting lug at the rear of said bracket, a pin at the forward end of the angle bar, a lever pivotally and slidingly connected to said pin, said lever having a slotted rear portion, a pin connected to the adjacent wing and inserted in said slotted rear portion, a lug connected to the wing and designed to be pivotally and detachably connected with the lug on the bracket, and a spring plate having a shoulder thereon connected with the wing, arranged and combined to operate in the manner set forth, and for the purposes stated.

2. An improved wagon end gate comprising a body portion and two wings, and an adjusting and retaining device for each wing comprising an angle bar, a bracket extending rearwardly and outwardly from the rear end of the angle bar, an upwardly projecting lug on said bracket, a bracket secured to the wing and having a lug to co-act with the aforesaid lug, a headed pin at the forward end of the angle bar at one side thereof, a lever having a slot therein to receive said pin, and also having an outwardly and rearwardly inclined portion adjacent to the said slot, said lever also being provided with a slot extending from a point near said outwardly and rearwardly inclined portion, to a point near the rear end of the lever, said slotted lever also having an opening substantially at its central portion, a headed pin on the wing designed to pass through said opening and to slide in said slot, and a plate fixed to the wing and having a shoulder therein, said parts being so arranged and combined that when the end gate is in its closed position, the lever will pass below the said shoulder, and be held thereby against upward movement, and when the end gate is in its position for use as a shoveling board, it will be supported by said lever and the pins, substantially as and for the purposes stated.

Des Moines, Iowa, October 12, 1908.

GEORGE WASHINGTON EDSON.

Witnesses:
W. F. MOORE,
W. D. MILLIGAN.